United States Patent

[11] 3,633,248

| [72] | Inventor | Robert Speedie<br>130 Alexandra Street, East St. Kilda,<br>Victoria, Australia |
|---|---|---|
| [21] | Appl. No. | 20,789 |
| [22] | Filed | Mar. 18, 1970 |
| [45] | Patented | Jan. 11, 1972 |
| [32] | Priority | Mar. 24, 1969 |
| [33] | | Australia |
| [31] | | 52424 |

[54] CABLE ANCHOR
8 Claims, 7 Drawing Figs.

[52] U.S. Cl. ..................................................... 24/73 AP,
      24/126 C
[51] Int. Cl. ............................................... A44b 21/00,
      F16g 11/00
[50] Field of Search .......................................... 24/73.7, 73
      PF, 126 C, 126 K, 136 K, 73 AP

[56] References Cited
UNITED STATES PATENTS

| 1,965,882 | 7/1934 | Cook | 24/73 SA UX |
| 3,176,944 | 4/1965 | Crates | 24/126 K UX |
| 3,508,730 | 4/1970 | Knezo | 24/73 SA X |
| 1,267,959 | 5/1918 | Becker | 24/126.3 UX |

FOREIGN PATENTS

| 1,387,824 | 12/1964 | France | 25/126.3 |

Primary Examiner—Donald A. Griffin
Attorneys—Robert W. Beart, Michael Kovac, Barry L. Clark and Jack R. Halvorsen ABSTRACT: A cable anchor for resisting pull through of a cable held by the anchor when tensional forces are applied to the cable. The anchor comprises a housing part and wedging means. In use, if tension is applied to the cable the wedging means moves under the housing part with the cable, and increasingly wedgingly engages the cable to resist such movement.

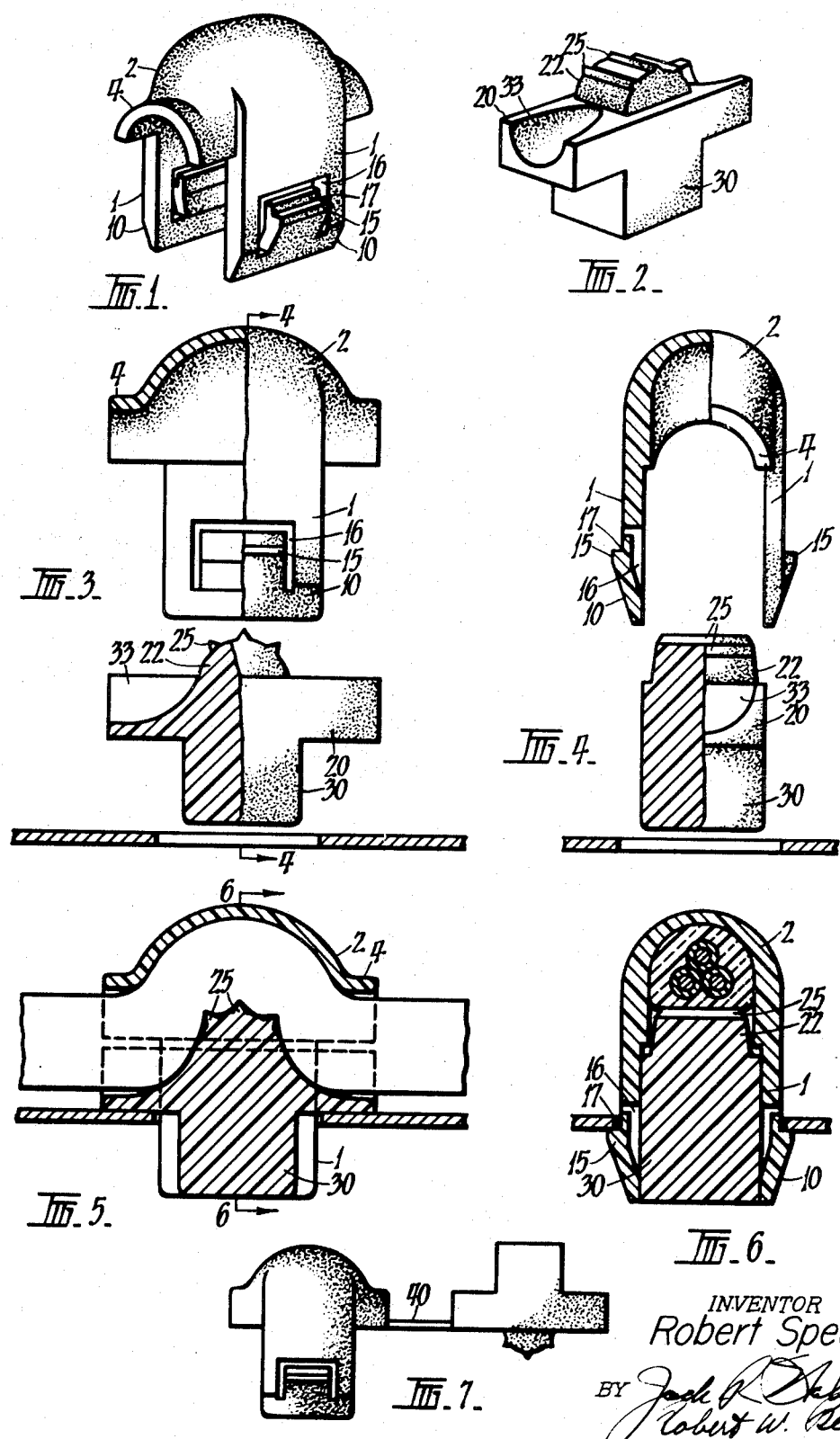

CABLE ANCHOR

DESCRIPTION OF THE PRIOR ART

Heretofore cable anchors have been developed for holding a cable to a workpiece. It is a disadvantage of the known types of cable anchor that as the cable is pulled with respect to the workpiece to which it is fastened, the cable can move through the anchor. Such movement can cause the insulation to be scraped off the cable, which can in turn be dangerous particularly if the cable is carrying a high voltage. It is a further disadvantage with the known types of cable anchor, that if the cable is moved through the anchor, as when tension is applied to the cable, the cable does not return to its initial position when the tension is removed, thus leaving a loose length of cable.

SUMMARY OF THE PRESENT INVENTION

The principal object of the present invention is the provision of a cable anchor which will resist pull through of the cable when tension is applied to the cable or either side of the anchor.

One feature of the present invention is the provision of a cable anchor comprising a housing securable to a workpiece and which has a cable passage therethrough, and wedging means located in said passage and movable with a cable therein generally axially thereof on application of tension to said cable along said axis to cooperate with the housing to increasingly wedgingly engage said cable to restrain said cable against movement through said passage.

Another feature of the present invention is the provision of a cable anchor comprising a housing securable to a workpiece, a cable passageway through the housing defining housing wedge surfaces engageable with a cable, a movable wedging member in the passage and having wedging surfaces extending generally in the same directions as the housing wedging surfaces and defining with the housing a tortuous path in said passageway for said cable in said passageway to wedge the cable when the cable is pulled axially in either direction.

Another feature of the present invention is the same as any one or more of the preceding features wherein the wedging member is provided with a projection which locates in a workpiece aperture and limits the movement of the wedging member relative to the housing.

Another feature of the present invention is the same as any one or more of the preceding features wherein the housing and wedging member are manufactured connected together, the integral connection being a thin frangible web.

Other features and advantages of the present invention will become apparent upon a perusal of the following specification taken in connection with the accompanying drawings wherein:

BRIEF DESCRIPTION OF THE DRAWINGS

FIG. 1 is a perspective view of a preferred form of a cable housing member forming a part of the anchor.

FIG. 2 is a perspective view of a preferred form of wedging member forming another part of the anchor.

FIGS. 3 and 4 are exploded part cross-sectional side and end views respectively of a housing member, wedging member and workpiece. The view in FIG. 4 is taken along line 4—4 of FIG. 3. FIGS. 5 and 6 are cross-sectional side and end views respectively of the cable anchor fastened to a workpiece. The view in FIG. 6 is taken along the line 6—6 of FIG. 5.

FIG. 7 is side view of a one-piece molding housing and wedging member.

DESCRIPTION OF THE PREFERRED EMBODIMENT

Referring now to FIGS. 1 and 4 the housing is substantially U-shaped in cross section and has two leg members 1 extending from an arched body part 2. The inside surfaces of the arched body part 2 terminates smoothly with arcuately shaped body extensions 4. The free end portion of legs 1 are tapered from the outer surface thereof towards the inner surface and the taper 10 extends to snap lock panel or workpiece-engaging means 15 provided in the legs 1. The snap lock-engaging means 15 are of substantially uniform thickness throughout. This is shown specifically in FIGS. 4 and 6. An inverted substantially U-shaped slot 16 surrounds the upper peripheral boundaries of the snap lock-engaging means 15 and allows for flexing thereof—independently of the leg 1 during engagement of the housing with a workpiece. The uppermost portions of the snap lock-engaging means 15 are stepped at 17 to provide shouldered surfaces for engaging with the edges of a workpiece surrounding an aperture into which the housing is to be fastened.

The wedging member shown in detail in FIGS. 2 3 and 4 comprises a body portion 20 with an arcuate-shaped upstanding portion 22 with ribs 25 positioned on the surface thereof and extending radially therefrom. Each of the rib surfaces 25 terminate at apexes. The upstanding portion 22 is slightly narrower than the body 20 of the wedging member and when in use, the portion 22 fits in the upper part of the body 2 of the housing. Part of the cable held by the cable anchor is caused to be deformed and retained in the upper part of the housing body thereby.

Extending from the lower central portion of the body 20 of the wedging member is a foot 30.

The foot or projection 30 is provided of to project through an aperture in the workpiece and allows for limited back and forth movement of the wedging member under the housing.

Scalloped cut outs 33 are provided on wings of the body 20 of the wedging member and are for receiving portion of a cable to be held by the cable anchor. The scalloped portions are shown best in FIG. 2.

The wings of the body part are of a length which will allow the wedging member to move to one end of the workpiece aperture in a position determined by the size of the foot thereof and which will prevent the wedging member from falling through the aperture. When in use—as shown in FIG. 5—the wedging member is firstly fitted with the foot or projection 30 in a workpiece or panel aperture. The cable is then fitted over the wedging member and the housing member is fitted finally over the cable and the edging member and snap lock engaged to the workpiece. During this snap lock engaging the cable is deformed over the wedging member and the ribs 25 on the wedge bite into the cable and provide a type of locking or holding of the cable to the wedging member. If tension is applied to the cable the cable and wedging member tend to move in the direction in which that tension is applied. Because the cable housing member has an arched body part the movement tends to compress the cable between the housing member and the wedging member. Equilibrium is set up when the component of compressive force balances the tension in the cable.

FIG. 7 shows the housing member and wedge member moulded in one piece, interconnected by a thin web 40. There are at least three advantages of having the housing member and the wedging member molded in one piece. The first is that it aids speedy manufacture. The second is that handling and packaging of the cable anchor is facilitated when the parts thereof are in one piece, and the third is that a tradesman or like person using the clamp can hold a cable in one hand and pick up a complete anchor in the other.

What is claimed is:

1. A cable anchor comprising a housing securable to a workpiece, there being a cable passageway through the housing defining housing wedging surfaces engageable with a cable, a movable wedging member in the passage and having wedging surfaces extending generally in the same directions as the housing wedging surfaces and defining with the housing a tortuous path in said passageway for said cable and wherein the wedging member moves with the cable in said passageway to wedge the cable when the cable is pulled axially in either direction, said wedging member being further provided with a projection which locates in a workpiece aperture and limits the movement of the wedging member relative to the housing.

2. A cable anchor as claimed in claim 1, wherein the wedging member is provided with ribs which facilitate frictional engagement with the cable.

3. A cable anchor as claimed in claim 1, wherein the housing and wedging member are manufactured connected togehter, the integral connection being a thin frangible web.

4. A cable anchor as claimed in claim 1, wherein the housing has snap lock-engaging means which engage peripheral edges of a workpiece surrounding an aperture, and secure the housing to the workpiece.

5. A cable anchor for maintaining a cable in restrained substantially parallel relation to a surface of an apertured panel comprising a housing substantially U-shaped in cross section defining a cable passageway, said housing having an arched portion, a pair of leg members extending from opposite sides of said arched portion and at least one arcuately shaped extension extending from said arched portion in the same direction as said cable passageway between said legs, means on said legs for engagement with an aperture in said panel, a wedging member adapted to fit within said housing and including a body portion having oppositely extending wing elements for overlying one surface of said panel and an arcuately shaped upstanding portion and complemental to said housing arched portion but spaced therefrom and defining a restricted cable passageway, a projection extending in the opposite direction from said upstanding portion and adapted to extend through the aperture in said panel, said projection having a predetermined smaller dimension relative to said aperture to permit limited movement of the wedging member under said housing in the direction of said cable passageway whereby exertion of a strain on a cable located within said passageway will move said wedging member relative to said panel and housing with said upstanding portion cooperating with said housing arched portion to aggressively grip a cable positioned therein.

6. A device of the type claimed in claim 5 wherein said wing elements are provided with scalloped cutouts for receiving a portion of the cable and are complemental in opposition to said arcuately shaped extensions on the housing to restrain the cable from lateral deflection out of the cable passageway.

7. A device of the type claimed in claim 5 wherein said upstanding portion is provided with one or more ribs extending transversely of the cable passageway to more aggressively grip the surface of the cable positioned between the upstanding portion and the arched portion of the housing.

8. A device of the type claimed in claim 5 wherein said means for engagement on said legs includes on each leg a resilient snap lock-engaging means defined by an inverted U-shaped slot surrounding the upper peripheral boundaries of the snap lock-engaging means, the free extremities of the engaging means being stepped to provide one or more shouldered surfaces for engaging with the edges of the panel surrounding the aperture into which the housing is fastened.

* * * * *